United States Patent
Zhou et al.

(10) Patent No.: US 6,479,561 B1
(45) Date of Patent: Nov. 12, 2002

(54) COLORED POLYURETHANE SURFACE COATINGS

(75) Inventors: Zhaolin Zhou, Amber Park (SG); Rubin Cai, Chai Wan (HK)

(73) Assignee: Milliken & Company, Spartanburg, SC (US)

( * ) Notice: Subject to any disclaimer, the term of this patent is extended or adjusted under 35 U.S.C. 154(b) by 13 days.

(21) Appl. No.: 09/651,327

(22) Filed: Aug. 30, 2000

(51) Int. Cl.$^7$ ............................................... C08G 18/00
(52) U.S. Cl. ................. 521/155; 428/411.1; 428/423.1; 428/423.3; 521/51
(58) Field of Search ........................... 428/423.3, 423.1, 428/411.1; 521/51, 155

(56) References Cited

U.S. PATENT DOCUMENTS

| | | | | |
|---|---|---|---|---|
| 5,231,135 A | * | 7/1993 | Machell et al. | 525/123 |
| 5,864,002 A | * | 1/1999 | Stephens et al. | 521/115 |
| 6,294,590 B1 | * | 9/2001 | Ragsdale et al. | 521/130 |

FOREIGN PATENT DOCUMENTS

| | | |
|---|---|---|
| DE | 11/14317 | 3/1959 |
| EP | 0/837082 | 4/1998 |

* cited by examiner

Primary Examiner—John M. Cooney, Jr.
(74) Attorney, Agent, or Firm—Terry T. Moyer; William S. Parks

(57) ABSTRACT

Improvements for in-mold polyurethane foam and/or resin products and the ability to provide surface coatings of such products exhibiting bright coloration and reduced colorant migration through utilization of easy-to-use polymeric colorants in simplified and environmentally friendly processing methods are disclosed. The inventive surface coating formulations include polyurethane-reactive polymeric colorants admixed with prepolymer and excess amounts of certain isocyanate compounds. Such a composition is applied (by spraying, for example) to a polyurethane prepolymer (for the production of the internal polyurethane article) which is then introduced within a mold in order to form a particularly shaped or configured polyurethane article with a colored surface coating. Upon curing through exposure to heat, the coating composition reacts with the introduced polyurethane prepolymer to form a surface over the target internal polyurethane. The excess isocyanate present within the surface coating has been found to provide surprisingly good non-migration and non-bleed properties to the polymeric colorant thereby permitting the addition of such a highly desired, high color space, and effective polyurethane colorant within such surface coatings. The specific method as well as colored polyurethane articles are also contemplated within this invention.

9 Claims, No Drawings

COLORED POLYURETHANE SURFACE COATINGS

FIELD OF THE INVENTION

This invention relates to improvements for in-mold polyurethane foam and/or resin products and the ability to provide surface coatings of such products exhibiting bright coloration and reduced colorant migration through utilization of easy-to-use polymeric colorants in simplified and environmentally friendly processing methods. The inventive surface coating formulations include polyurethane-reactive polymeric colorants admixed with prepolymer and excess amounts of certain isocyanate compounds. Such a composition is applied (by spraying, for example) to an internal composition, such as, preferably, mixtures of isocyanates and polyols (for the production of the internal polyurethane article) which is then introduced within a mold in order to form a particularly shaped or configured polyurethane article with a colored surface coating. Upon curing through exposure to heat, the coating composition reacts with the introduced polyurethane prepolymer to form a surface over the target internal polyurethane. The presence of excess isocyanate within the surface coating has been found to provide surprisingly good non-migration and non-bleed properties to the polymeric colorant thereby permitting the addition of such a highly desired, high color space, and effective polyurethane colorant within such surface coatings. The specific method as well as colored polyurethane articles are also contemplated within this invention.

BACKGROUND OF THE PRIOR ART

In-mold polyurethane production has been practiced for many years in order to form thermoplastic or resinous articles of various shapes, sizes, and configurations. Such articles include, without limitation, novelty items, such as foam balls, seat cushions, automobile interior parts, such as steering wheel cushions and dashboards, and the like. Such products have generally consisted of internal polyurethane foam or resin and external coatings of either the same or different polyurethane formulations. In-mold processes have been developed and practiced to provide strong surfaces over the internal foam or resin in order to improve the quality of the molded article itself. Such a coating layer reduces surface defects such as sink marks, pores, microcracks and surface waviness to provide a more resilient polyurethane product.

Colored surface coatings are normally required to provide an acceptable appearance to the polyurethane article by masking the discoloration (yellowing) resulting from photochemical oxidation of bonded urethane during and after the in-mold curing process. Thus, for aesthetic reasons, both the internal and external compositions of such articles have been colored; however, different dyes and/or pigments have been required for both formulations due to the differences in processing and chemical constituents. Because of these differences, surface coatings have generally been prepared through the prior application of dyes, pigments, dyestuffs, or any combination thereof, to either the outer surface of the internal polyurethane or the mold surface itself. Traditionally, colored polyurethane coatings have been provided through the utilization of inorganic or organic pigments admixed with polyols to form a paste which is then coated over the mold surfaces within which the internal polyurethane prepolymer is then introduced. Upon curing, the coating attaches to the internal polyurethane to form the desired coated article. The selection of suitable dyes and pigments for this purpose is highly dependent on a number of qualities exhibited by such coloring agents, including dispensability, temperature stability, and migration stability in polyurethane.

Over and above such preliminary considerations is the fact that such dyes and pigments are difficult to handle in general as they are typically either provided in solid form, as powders (which contributes to breathing difficulties, etc., on an industrial level) or as dispersions. However, such dispersions are usually produced months prior to actual use and thus must be stored and transported. Due to the solid nature of such coloring agents, problems persist with the precipitation of such products over time that thus necessitates continued manipulation of the target dispersions by the user. As a result, the user must attempt to thoroughly mix the pigment dispersions prior to actual incorporation within the target articles. However, uniform stirring has proven difficult to attain which has invariably led to problems with uniform coloring of such polyurethane articles on an industrial scale. Additionally, due to the high staining characteristics of such dyes, pigments, etc., such past in-mold coloring procedures have required extensive cleaning steps if different colors are desired within certain molds, which may lead to higher costs of production. Furthermore, such pigments, dyes, etc., may also contain heavy metals which have proven to be environmentally taxing due to necessity of disposing of any excess coloring agents into groundwater, streams, and the like.

Although such dyes and pigments have proven to be relatively inexpensive, their performance as surface coating colorants has been unexceptional. For instance, the presence of solid particles has created specular reflectance problems which have resulted in the production of dull shades within the target coatings. Also, such particulate-containing coloring agents are generally difficult to thoroughly blend (if different pigments, dyes, etc., are mixed to produce different colors and/or shades) together, particularly in order to provide uniform colorations throughout entire batches of articles.

Polymeric colorants have been utilized in the past to possibly react with such surface polyurethanes to provide improvements in colorations. Such colorants, including those taught within U.S. Pat. No. 4,507,407 to Kluger et al., U.S. Pat. No. 4,751,254 to Kluger et al., U.S. Pat. No. 4,775,748 to Kluger et al., U.S. Pat. No. 4,846,846 to Rekers et al., U.S. Pat. No. 5,231,135 to Machell et al., and U.S. Pat. No. 5,864,002 to Stephens et al., all herein entirely incorporated by reference, do react with the urethane groups of the polymer to integrally become part of the polymer itself. However, such colorants are highly water soluble and have experienced problems with migration and bleed from such polyurethane surface coatings in the past. As such, loss of color over time and through simple frictional contact and/or atmospheric or liquid extraction have posed significant problems. Although such problems have persisted, there is a definite desire to utilize such colorants within polyurethane surface coating applications, primarily due to the ease of handling and storing of such liquid or waxy colorants over time (without precipitation problems or concerns); the ease in cleaning up after use due their high water solubility, greater flexibility through facilitating production of different colors and shades through simple mixing procedures as compared with dyes and/or pigments; and the environmentally friendly nature of such colorants due to their polymeric nature and thus high molecular weight.

As such, it has been of great desire to utilize such colorants within surface coating formulations for polyurethane articles. Unfortunately, the prior art has not accorded any improvements over the migration and color extraction as noted above for such colorants.

OBJECTS AND BRIEF DESCRIPTION OF THE INVENTION

It is thus an object of this invention to provide a method of forming a colored polyurethane coating having a substantially smooth, brightly colored, aesthetically appealing surface. It is another object of this invention to provide a method of forming colored polyurethane coating for a polyurethane article with liquid, homogeneous colored polymeric colorants which exhibit substantially no migration, color loss, and/or color bleed problems over long-term use of the article. A further object of the invention is to provide an effective, aesthetically appealing, stable polyurethane colored surface coating without the need for heavy-metal containing compounds to provide such colorations.

Accordingly, this invention encompasses a colored polyurethane surface coating composition present over an article, preferably, though not necessarily, comprising a polyurethane resin or foam, wherein said surface coating comprises polymeric colorants, wherein the degree of coloration of colored polyurethane surface coating is retained after continued frictional contact and/or exposure to moisture. This invention also encompasses a composition of polymeric colorants admixed with from 1 to 3 times the amount of such colorants with an isocyanate compound selected from the group consisting of phenyl-based isocyanates and alkyl-based isocyanates. Further encompassed within this invention is a method of coloring a polyurethane surface coating of a polyurethane article comprising the steps of providing a polyurethane prepolymer composition; applying to the surface of such composition a formulation of polyurethane surface coating prepolymer further comprising a mixture of at least one polymeric colorant and (preferably, though not necessarily, from 1 to 3 times the amount of said polymeric colorant of) an isocyanate compound (preferably, though not necessarily, selected from the group consisting of phenyl-based isocyanates and alkyl-phenyl-based isocyanates); placing said coated polyurethane prepolymer within a mold; and curing said coated polyurethane polymer.

DETAILED DESCRIPTION OF THE INVENTION

The particularly preferred polymeric colorants of this invention are available from Millliken & Company. Such colorants include polyoxyalkylene chains attached to chromophore constituents through linking groups. Such polyoxyalkylene moities, being hydroxyl terminated polyols, readily react with the isocyanates required to produce the target polyurethane and therefore become integrally part of the final polyurethane structure. The preferred colorants in this general class represented by the following formula (I):

$$R\{A[(B)_n]_m\}_x \qquad (I)$$

wherein

R is an organic chromophore;

A is a linking moiety in said chromophore selected from the group consisting of N, O, S, SO$_2$N, and CO$_2$;

B is an alkyleneoxy constituent contains from 2 to 4 carbon atoms;

n is an integer of from 75 to about 500;

m is 1 when A is O, S, or CO$_2$, and m is 2 when A is N or SO$_2$N; and x is an integer of from 1 to about 5. The molecular weight of such colorants are at least 2000 and, due to the high oxyalkylenation present, are highly water soluble and liquid at room temperature. The organic chromophore is, more specifically, one or more of the following types of compounds: azo, diazo, disazo, trisazo, diphenylmethane, triphenylmethane, xanthene, nitro, nitroso, acridine, methine, styryl, indamine, thiazole, oxazine, stilbene, or anthraquinone. Preferably, R is one or more of azo, diazo, triphenylmethane, methine, anthraquinone, or thiazole based compounds. Such a group may produce coloring effects that are evident to the eye; however, optical brightening chromophores are also contemplated in this respect. Group A is present on group R and is utilized to attach the polyoxyalkylene constituent to the organic chromophore. Nitrogen is the preferred linking moiety. The polyoxyalkylene group is generally a combination of ethylene oxide and propylene oxide monomers. Preferably propylene oxide is present in the major amount, and most preferably the entire polyoxyalkylene constituent is propylene oxide.

The preferred number of moles (n) of polyoxyalkylene constituent per polyoxyalkylene chain is from 6 to 50, more preferably from 10 to 30. Also, preferably two such polymeric chains are present on each polymeric colorant compound (x, above, is preferably 2). In actuality, the number of moles (n) per polymeric chain is an average of the total number present since it is very difficult to control the addition of specific numbers of moles of alkyleneoxy groups. The Table below lists the particularly preferred colorants (with the range of alkoxylation present on the colorant listed due to the inexactness of production of specific chain lengths) for utilization within the inventive in-mold polyurethane surface coatings in relation to Structure (I), above:

COLORANT TABLE
Preferred Poly(oxyalkylenated) Colorants

| Col. # | R | A | B(with moles) | m | x | Color |
|---|---|---|---|---|---|---|
| 1 | Methine | N | 6–8 EO; 12–15 PO | 2 | 1 | Yellow |
| 2 | Benzothiazole diazo | N | 6–8 EO; 10–12 PO | 2 | 1 | Red |
| 3 | Triphenylmethane | N | 2–4 EO; 12–15 PO | 2 | 2 | Blue |
| 4 | Aminothiophene Diazo | N | 10–12 EO; 12–15 PO | 2 | 1 | Violet |
| 5 | Phenyl Diazo | N | 8–10 EO; 10–12 PO | 2 | 2 | Orange |

As noted above, such colorants provide excellent colorations for polyurethane formulations (be they resin, foam, or other structure). Furthermore, it is relatively easy to mix such differently shaded or colored colorants together to produce different shades and hues within the target surface coating (since such colorants are generally liquid in nature and mix thoroughly and homogeneously). However, problems do exist for such colorants in relation to their presence within relatively thin polyurethane surface coating compositions. Frictional contact (and thus slightly elevated temperatures), atmospheric exposure to light sources and/or sources of ultraviolet radiation, exposure to moisture, and the like, all contribute to the degradation of the bonds between the terminal polyol of the colorant and the isocyanate constituent within the surface coating composition. Upon degradation, the colorants exhibit increased degrees of migration from the polyurethane medium and thus color loss within the surface coating itself.

In order to alleviate such a condition and thus permit the utilization of such excellent sources of polyurethane colors within polyurethane surface coatings, it has now been determined that the addition of certain amounts of isocyanate compounds within the prepolymer colorant-containing composition unexpectedly reduces the possibility of colorant/urethane degradation, and thus colorant migration and loss. Such isocyanates must be present in an amount of from 1 to 3 times the amount of the colorants themselves by weight. Of particular interest are isocyanates selected from the group consisting of phenyl-based and alkyl-based isocyanates, as well as di- and tri-isocyanates. Particularly preferred are diphenylmethane diisocyanate (MDI) and toluene diisocyanate (TDI) for this purpose, as well as mixtures thereof. Although such isocyanates are standard components within polyurethane systems (for reaction with polyol components to form the desired polyurehtanes), their addition as separate components within a prepolymer composition (which thus comprises the polyol/isocyanate reaction product for further polymerization) has not been practiced previously, and particularly not to provide the beneficial introduction and retention of polymeric polyurethane-colorants within specific polyurethane surface coatings. Without intending to be bound to any particular scientific theory, it is believed that the addition of such extra isocyanates provides a reactive site for polymeric colorant attachment which then can be incorporated within the target polyurethane during polymerization (curing). Also, the excess amounts of isocyanate may react with non-reacted polyol remaining within the prepolymer in order to more efficiently and effectively make use of all of the constituent reactants. In any event, surprisingly, the addition of such excess amounts of free isocyanates has resulted in the ability to more effectively introduce such highly desirable polymeric colorants within such inventive polyurethane surface coating formulations. The resultant prepolymer mixture thus comprises the polyurethane prepolymer (which must be cured at elevated temperatures in a mold), at least one polymeric colorant, at least one isocyanate compound present in the amount noted above in relation to the polymeric colorant, and any other solvents, additives, and the like. Such a prepolymer composition may be prepared up to 8 hours prior to application within a mold without precipitation or separation difficulties and thus provides a relatively low-cost alternative to the dyes and pigments mentioned above.

The amount of polymeric colorant present within the prepolymer composition is within the range of concentrations of 0.01 to 20% by weight of the total prepolymer composition, preferably between about 1 to 10%. Thus, the isocyanate is added anywhere from between 0.01 to 300% by weight of the colorant present within the composition, preferably about 200%.

In general, polyurethane foam is produced through the catalyzed polymerization of the reaction products of polyols and isocyanates. Such a reaction is well known throughout the polyurethane industry and has practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred are Yukol 3553 from SK Oxichemical (Korea) and F3022 polyol, available from Lyondell.

Isocyanates, and more specifically, diisocyanates, are well known components of such polyurethane foams and include any compounds which possess at least one free cyanate reactive group. Preferably such compounds comprise more than one such free cyanate reactive group, most preferably two, however, greater numbers may be utilized as well. Such preferred diisocyanates are also either aliphatic or aromatic in nature. The most prominently utilized isocyanates, and thus the most preferred types for this invention, are toluene diisocyanate and methylene diisocyanate. Typically, the polyol is reacted with a small excess of isocyanate (ratio of from 1:1.04 to 1:1.2) in order to produce flexible foam products; higher excesses of isocyanate produce more rigid foams. In practice, two separate streams of liquids (one of polyol, the other of isocyanate) are mixed together in the presence of a gelation and, if a foam product is desired, blowing catalyst and a blowing agent.

For the internal polyurethane, the mixture comprises any well known polyots and isocyanate components, which form polyurethane upon curing at elevated temperatures (e.g., between about 50° and 100° C.). Thus, MDI or TDI and polyols produced from ethylene oxide (EO) or propylene oxide (PO) are acceptable in this instance. In this particular invention, preferably the polyol is Yukol 3553, and the isocyanate is MDI 2412 (available from Imperial Chemical) in a ratio of about 70:30. Generally, the components present within the internal polyurethanes are of a different type from those within the surface coating composition. In this invention, the preferred prepolymer fort he inventive surface coating is a commercially available prepolymer (isocyanate terminated) from Supro CT/E Industrial Corporation of Taiwan diluted about 10 times (by weight) with methylethyl ketone.

Solvents may be present within the prepolymer composition as well, including, without limitation, methylethyl ketone (MEK), esters, and ether-esters. Aromatics, such as toluene and xylene, as merely examples, as well as aromatic-rich petroleum distillates may also be utilized. Some moisture is permitted to be present and, at times, aids in the polymerization procedure. Other additives may be present as well for different purposes, including, without limitation, antibacterial and antimicrobial agents, antistatic agents, perfumes, and the like. One preferred type of additive is fillers which aid in providing substantial opacity to the surface coating. It has been noted that certain polymeric colorants are rather transparent and thus the surface coating does not completely hinder viewing of the internal polyurethane. Such opacifying fillers thus prevent such a potential problem without modifying the color of the surface coating itself. Such opacifiers include, without limitation, calcium carbonate, and the like, and are added in amount of from about 5 to about 20% by weight of the total prepolymer composition, preferably about 10%.

Polyurethane surface coatings may be broadly defined as coatings that contain urethane or urea groups. The coating itself may be divided into so-called one-component or two-component systems depending upon the reactive nature of the prepolymer. Thus, in a non-reactive system, the isocyanate and polyol constituents are substantially all reacted to form the target urethane for polymerization. A reactive system is preferred for the surface coating composition in that there are an appreciable number of unreacted isocyanate sites within the prepolymer for reaction with atmospheric moisture or polyol-containing polymeric colorants to form the urethane or urea moieties. Upon reaction of the extra isocyanate additives in combination with the polyol-containing polymeric colorants, reaction between such isocyanates and the prepolymeric isocyanate constituents (both the extra diisocyanates added and the isocyanate groups react with a colorant polyol) and the polymeric colorants are permitted and produces an integrated, low migration, colored surface coating.

The resultant surface coatings thus exhibit extremely bright colorations with simultaneously extremely low degrees of color migration and/or color loss. Such bright colors have heretofore not been possible in combination with the low migration and color loss characteristics due to the difficulties inherent with such polymeric colorants within the relatively thin layers of surface coating materials. Thus, the inventive introduction of excess isocyanate within the prepolymer composition has accorded the ability to produce such highly desirable polyurethane surface coatings for in-mold polyurethane articles.

The inventive surface coating composition is particularly useful in coating compression molded thermoplastic resin substrates, and primarily thermoplastic resin substrates which have come to be known in the art as reaction injection molding (RIM), reinforced reaction injection molding (RRIM), resin transfer molding (RTM), structure rection injection molding (SRIM) and other types of thermoplastic composite substrates. The surface coating composition is thus sprayed onto the mold surface before the internal prepolymer is introduced and cured. After curing, the finished polyurethane article is then removed from the mold with the colored surface coating intact.

PREFERRED EMBODIMENTS OF THE INVENTION

The invention is herein further described by the following non-limiting examples.

Polymer Formation

The following Composition Table lists the particular coating formulations tested within this invention, including comparative examples. The additives are listed with colorant (from the Colorant Table, above), the isocyanate component, the solvent, the urethane prepolymer (in each instance Supro/E from Industrial Corporation, Taiwan), and any filler (calcium carbonate) for opacity, all listed with their weight as added within the final composition. The colorants in Examples M and N, below are mixtures of 80%/20% by total colorant weight of Colorants 3 and 4.

COMPOSITION TABLE
Inventive Coating Formulations (with Comparative Examples)

| Ex. | Colorant # | Isocyanate | MEK | Prepolymer | CaCO$_3$ |
|---|---|---|---|---|---|
| A | 3 (5 g) | TDI (10 g) | 250 g | 50 g | — |
| B | 3 (5 g) | TDI (10 g) | 500 g | 50 g | — |
| C | 3 (2.5 g) | TDI (5 g) | 150 g | 50 g | 5 g |
| D | 3 (2.5 g) | MDI (5 g) | 150 g | 25 g | 2.5 g |
| E | 2 (2.5 g) | MDI (5.4 g) | 150 g | 25 g | 2.5 g |
| F | 2 (2.5 g) | TDI (5 g) | 150 g | 25 g | 2.5 g |
| G | 5 (1.35 g) | TDI (2.7 g) | 150 g | 12.5 g | 1.25 g |
| H | 5 (1.25 g) | MDI (2.5 g) | 150 g | 12.5 g | 1.25 g |
| I | 1 (1.35 g) | TDI (2.7 g) | 150 g | 12.5 g | 1.25 g |
| J | 1 (1.25 g) | MDI (2.7 g) | 150 g | 12.5 g | 1.25 g |
| K | 4 (1.25 g) | TDI (2.5 g) | 150 g | 12.5 g | 1.25 g |
| L | 4 (1.25 g) | MDI (2.5 g) | 150 g | 12.5 g | 1.25 g |
| M | 3 & 4 (1.25 g) | TDI (2.5 g) | 150 g | 12.5 g | 1.25 g |
| N | 3 & 4 (1.25 g) | MDI (2.5 g) | 150 g | 12.5 g | 1.25 g |

-continued

COMPOSITION TABLE
Inventive Coating Formulations (with Comparative Examples)

| | Colorant # | Isocyanate | MEK | Prepolymer | CaCO$_3$ |
|---|---|---|---|---|---|
| (Comparative Examples) | | | | | |
| O | 3 (5g) | — | 250 g | 50 g | — |
| P | 3 (2.5 g) | — | 150 g | 25 g | 2.5 g |
| Q | 1 (2.5 g) | — | 150 g | 25 g | — |
| R | 2 (2.5 g) | — | 150 g | 25 g | — |
| S | 4 (2.5 g) | — | 150 g | 25 g | — |
| T | 5 (2.5 g) | — | 150 g | 25 g | — |

The resultant mixtures were stirred for 5 minutes after which they were ready for utilization within a coating application.

In-Mold Applications

The general process followed in utilizing such coating compositions within coating applications was as follows:

(1) a mold-releasing agent (Jali of Taiwan, RA-314 diluted with methylene chloride at a 1:10 ratio) was sprayed on the surface of a target mold;

(2) the coating compositions from the Composition Table were individually sprayed on an even basis onto separate target mold surfaces;

(3) the two component polyurethane components were then injected into the pretreated target molds;

(4) the injected components and the coating compositions were then cured (at temperatures between 40 and 60° C. for 5–10 minutes; and (5) the finished parts were then removed from each separate mold.

Each of the compositions listed in the Composition Table were integrally cured within the coating of a polyurethane article in accordance with this process internal polyurethane components of 70 parts of Yukol 3553 to 30 parts MDI 2412. The resultant articles were then tested for certain requisite characteristics, such as color bleed and color loss by extraction (with the particular composition designations from the Composition Table, above, used as the designations for the articles prepared from those specific compositions.

Color Bleed Testing

To test for color bleed, the coatings of the resultant polyurethane articles made by the process described above were pressed (by clamps) against separate pieces of white paper at the pressure of about 5 kg/cm$^2$. These samples then were put in an oven for 24 hours at 60° C. The lack of color residue on the test paper indicated a passing grade for this test while any residue present resulted in a fail. Inventive Articles A-N passed the test while Comparative Examples O-T all exhibited color residue and thus merited a failing grade. Thus, the inventive articles exhibited the requisite nonexistent color bleed properties with the excess isocyanate present whereas the comparatives without such a component failed such a necessary test.

Extraction (Color Loss) Testing

To test for color loss (measured as the change in Absorptivity, otherwise known as absorption/g/liter, as measured with a UV/V is spectrometer) of the coating skin layers, certain articles were placed in a 5% soap (a liquid hand soap from Yuri, Align Distribution Pte. Ltd,., Singapore) solution for 4 hours at room temperature. A change in absorptivity of greater than about 0.04 is unacceptable as permitting too much color extraction. Preferably, such an absorptivity level is lower than about 0.03, more preferably lower than about 0.02, and most preferably lower than about 0.01. Such an absorptivity change is performed by analyzing a colored extraction solution after removal of the tested coated polyurethane article from the soap extraction solution. The resulting measurements for these specific articles is as follows:

EXPERIMENTAL DATA TABLE
Extraction Results for Prepared Articles with Inventive and Comparative Coatings

| Example | Absorptivity Change after 4 hours |
|---------|-----------------------------------|
| A | 0.0012 |
| E | 0.0009 |
| G | 0.0004 |
| I | 0.0009 |
| K | 0.0002 |
| O | 0.0567 |
| Q | 0.1972 |
| R | 0.1082 |
| S | 0.0465 |
| T | 0.1398 |

Thus, the inventive coatings exhibited greatly improved extraction characteristics in comparison with the coatings not comprising the excess isocyanate component.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as incorporate the features of the invention within the true meaning, spirit, and scope of such claims.

What is claimed is:

1. An article comprising an internal component selected from the group consisting of a resin and a foam over which at least a portion of said internal component is integrally coated with a colored polyurethane surface coating composition, wherein said polyurethane surface coating comprises at least one polymeric colorant in an amount of from about 0.1 to about 10% by weight of the entire surface coating composition, and wherein said at least one polymeric colorant exhibits an extraction level of below a change of about 0.04 absorptivity units (absorption/g/liter) upon placement of said polyurethane surface coating composition within a soap extraction solution, wherein said change in absorptivity units is measured as the comparison of the absorptivity of said soap extraction solution prior to extraction and after room temperature exposure for about four hours.

2. The article of claim 1 wherein said colored polyurethane surface coating also passes a color bleed test wherein said surface coating of said article is pressed against separate pieces of white paper at the pressure of about 5 kg/cm$^2$ for 24 hours while heated in an oven at a temperature of 60° C.

3. The article of claim 1 wherein said polyurethane surface composition is substantially opaque.

4. The article of claim 2 wherein said polyurethane surface composition is substantially opaque.

5. The article of claim 1 wherein said internal component is a polyurethane.

6. The article of claim 2 wherein said internal component is a polyurethane.

7. The article of claim 3 wherein said internal component is a polyurethane.

8. The article of claim 4 wherein said internal component is a polyurethane.

9. The article of claim 1 wherein said at least one polymeric colorant is present in an amount of from about 1 to about 10% by weight of the total weight of the polyurethane surface coating composition.

* * * * *